Figure 1:
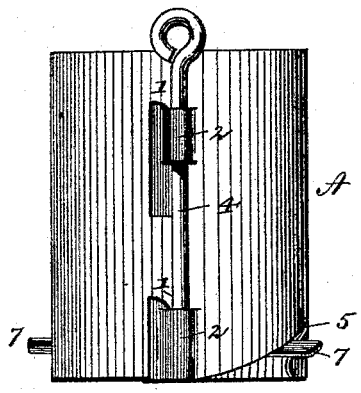

(No Model.)

J. H. THAYER.
FLOWER POT.

No. 411,739. Patented Sept. 24, 1889.

WITNESSES

INVENTOR

UNITED STATES PATENT OFFICE.

JULIEN HENDERSON THAYER, OF MOUNT PLEASANT, NORTH CAROLINA.

FLOWER-POT.

SPECIFICATION forming part of Letters Patent No. 411,739, dated September 24, 1889.

Application filed December 22, 1888. Serial No. 294,413. (No model.)

*To all whom it may concern:*

Be it known that I, JULIEN HENDERSON THAYER, a citizen of the United States, and a resident of Mount Pleasant, in the county of Cabarrus and State of North Carolina, have invented certain new and useful Improvements in Flower-Pots; and I do hereby declare that the following is a full, clear, and exact description of the invention, which will enable others skilled in the art to which it appertains to make and use the same.

This invention relates to flower-pots.

The object is to produce a pot to be used for rooting and transplanting flowers or other plants, by means of which they may be removed from the pot for the purpose of planting without the danger of killing the same by injuring the roots by breaking or displacing them; furthermore, to produce a pot which shall be simple of construction, efficient and durable in use, and which may be constructed at but a slight expense.

With these objects in view the invention consists in the novel construction and combination of parts of a flower-pot, as will be hereinafter fully described in the specification, illustrated in the drawings, and more particularly pointed out in the claims.

Figure 2:
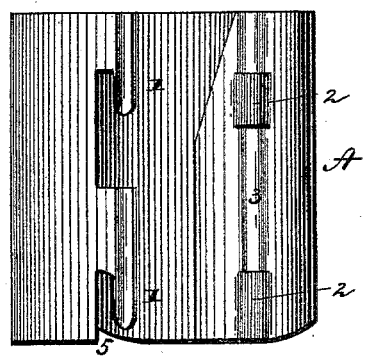
Figure 3:
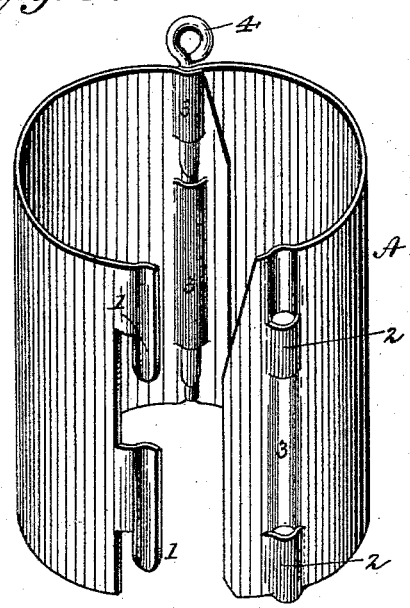
Figure 4:
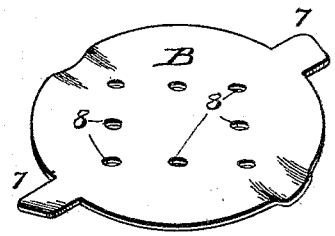

In the accompanying drawings, forming part of this specification, and in which like letters of reference indicate corresponding parts, I have illustrated one form of device embodying the essential features of my invention, although the same may be carried into effect in other ways without departing from the spirit thereof; and in these drawings Figure 1 is a side elevation of one of my improved pots closed. Fig. 2 is a similar view open. Fig. 3 is a perspective view of another form of the same, showing one side opened and one closed; and Fig. 4 is a detail view of the bottom of the pot.

Referring to the drawings, A designates the body of pot, which may be made of any suitable material—such as sheet-iron, galvanized iron, zinc, or copper. It may be made in one piece, as shown in Fig. 1; but, if desired, the pot shown in Fig. 2 may be used—that is, being made of two parts. On one of the edges of this body the metal is cut away to form two downward-extending lugs 1, which fit in grooves or recesses 2, formed in the opposite edge of the body, these openings being formed by cutting longitudinal slits and then raising the metal between the slits. The metal under these grooves or recesses is formed into a channel 3, as is also the metal in the downward-extending lugs, and when these lugs engage the openings they form a straight passage for a pin 4, by means of which the device is held together. The bottom of this body is provided with two inclined slits 5, in which the bottom B fits. It will be observed that this bottom is circular in form and is provided with two arms 7, which are designed to fit in the inclined slits before referred to, and the center portion is provided with a number of openings 8, through which any moisture may escape when the plants are being watered.

Having now described the different parts of my device, I will proceed to show the manner in which it is operated.

When this pot is to be used either for the purpose of sprouting or transplanting, it is secured together as shown in Fig. 1, with the bottom in place. The body is then filled with dirt and the plant placed therein. Now, should it be desired to transplant this plant, a hole is sunk in the earth of a depth equal to the height of the pot, and the bottom of the pot is then removed, the dirt remaining in place therein by means of its sticking to the sides. Pin 4 is then withdrawn, and by placing the hand upon one side of the point of juncture, holding it down, and lifting up the other side, the lugs will be thrown out of contact with the openings, and the pot will spring apart, as shown in Fig. 2, when it may be withdrawn from the ground without disturbing the dirt around the roots of the plant.

It will thus be seen that by this peculiar construction of a flower-pot all danger arising from transplanting will be removed, for the reason that the dirt around the roots is not disturbed in the least.

Having thus fully described my invention, what I claim as new, and desire to secure by Letters Patent, is—

1. A flower-pot made of a piece of suitable metal, provided on one edge with downward-extending lugs adapted to fit in grooves or recesses formed on the opposite edge, whereby the pot will be held together, substantially as described.

2. The combination, with the flower-pot, one edge of which is provided with downward-extending lugs adapted to fit in grooves or recesses formed in the opposite edge, of a pin engaging the said openings for holding the pot securely together, substantially as described.

3. The combination, with the pot having inclined slits near the lower end thereof, of a bottom having arms adapted to engage the slits, substantially as and for the purpose specified.

4. The combination, with the pot having inclined slits near the lower end thereof, of a perforated bottom having arms adapted to engage the slits, substantially as described.

In testimony that I claim the foregoing as my own I have hereunto affixed my signature in presence of two witnesses.

JULIEN HENDERSON THAYER.

Witnesses:
M. L. BUCHANAN,
W. R. ROSE.